United States Patent
Thompson (10) Patent No.: US 9,629,763 B2
(45) Date of Patent: Apr. 25, 2017

(54) REAR STEER PORTABLE WHEELCHAIR

(71) Applicant: THOMPSON LAFFERTY DESIGN LIMITED, Greytown (NZ)

(72) Inventor: Peter James Thompson, Greytown (NZ)

(73) Assignee: Thompson Lafferty Design Limited, Greytown (NZ)

( * ) Notice: Subject to any disclaimer, the term of this patent is extended or adjusted under 35 U.S.C. 154(b) by 23 days.

(21) Appl. No.: 14/428,438

(22) PCT Filed: Sep. 18, 2013

(86) PCT No.: PCT/NZ2013/000169
§ 371 (c)(1),
(2) Date: Mar. 16, 2015

(87) PCT Pub. No.: WO2014/046551
PCT Pub. Date: Mar. 27, 2014

(65) Prior Publication Data
US 2015/0250667 A1   Sep. 10, 2015

(51) Int. Cl.
*B62B 3/00* (2006.01)
*A61G 5/08* (2006.01)
(Continued)

(52) U.S. Cl.
CPC ............ *A61G 5/08* (2013.01); *A61G 5/0825* (2016.11); *A61G 5/0866* (2016.11); *A61G 5/0883* (2016.11); *A61G 5/1008* (2013.01); *A61G 5/1013* (2013.01); *A61G 5/1027* (2013.01); *A61G 5/1051* (2016.11); *B60R 22/00* (2013.01)

(58) Field of Classification Search
CPC .......... A61G 5/00; A61G 5/08; A61G 5/1013; A61G 5/1027; A61G 5/1008; A61G 5/1005; A61G 5/1037; A61G 2005/0883; A61G 2005/0825; A61G 2005/0866; A61G 2005/1051; A61G 2005/0816; A61G 2005/128; A61G 5/0883; A61G 5/0825; A61G 5/0866; A61G 5/1051; A61G 5/0816; A61G 5/128
See application file for complete search history.

(56) References Cited

U.S. PATENT DOCUMENTS 3,191,953 A * 6/1965 Aysta ................... A61G 5/061
280/11
3,968,991 A * 7/1976 Maclaren ................ A61G 5/08
248/436
(Continued)

FOREIGN PATENT DOCUMENTS

CN       102824251      12/2012
EP         1454606 A1    9/2004

OTHER PUBLICATIONS

International Search Report—PCT/NZ2013/000169—mailed Dec. 2, 2013.
(Continued)

*Primary Examiner* — James M Dolak
(74) *Attorney, Agent, or Firm* — Karish & Bjorgum, PC (57) ABSTRACT

The present invention relates to improvements in the design of a rear-steer collapsible, in particular the invention relates to a number of safety enhancing features that provide a safer and more versatile rear steer portable wheelchair.

10 Claims, 12 Drawing Sheets

(51) Int. Cl.
*A61G 5/10* (2006.01)
*B60R 22/00* (2006.01)

(56) References Cited

U.S. PATENT DOCUMENTS

| | | | |
|---|---|---|---|
| 4,585,241 A * | 4/1986 | Misawa | A61G 5/061 |
| | | | 180/9.22 |
| 4,648,619 A | 3/1987 | Jungnell et al. | |
| 5,188,383 A | 2/1993 | Thompson | |
| 5,294,141 A * | 3/1994 | Mentessi | A61G 5/00 |
| | | | 188/2 F |
| 5,593,173 A | 1/1997 | Williamson | |
| 5,857,688 A | 1/1999 | Swearingen | |
| 6,173,986 B1 * | 1/2001 | Sicher | A61G 5/023 |
| | | | 280/242.1 |
| 6,206,405 B1 * | 3/2001 | Watkins | A61G 5/08 |
| | | | 280/647 |
| 6,329,771 B1 | 12/2001 | Choi et al. | |
| 6,341,784 B1 * | 1/2002 | Carstens | A61G 5/061 |
| | | | 180/8.2 |
| 6,616,172 B1 | 9/2003 | Cockram | |
| 6,793,232 B1 * | 9/2004 | Wing | A61G 5/006 |
| | | | 280/304.1 |
| 6,910,543 B2 * | 6/2005 | Kanno | A61G 5/045 |
| | | | 180/19.3 |
| 7,077,422 B2 * | 7/2006 | Haury | A61G 5/08 |
| | | | 280/644 |
| 7,311,160 B2 * | 12/2007 | Lim | A61G 5/02 |
| | | | 180/9.26 |
| 7,669,881 B2 * | 3/2010 | Haury | A61G 5/08 |
| | | | 280/649 |
| 9,504,618 B2 * | 11/2016 | Lykkegaard | A61G 5/1059 |
| 2003/0098190 A1 | 5/2003 | Kanno et al. | |

OTHER PUBLICATIONS

Supplementary European Search Report—Apr. 12, 2016—App. 13838981.2, PCT/NZ2013000169.

* cited by examiner

REAR STEER PORTABLE WHEELCHAIR

FIELD OF THE INVENTION

The present invention relates to improvements in the design of a rear steer portable wheelchair. The portable wheelchair is collapsible for ease of deployment, handling and transport, while also providing a strong and manoeuvrable wheelchair.

CROSS-REFERENCE TO RELATED APPLICATIONS

This application is a national stage application (under 35 U.S.C. §371) of PCT/NZ2013/000169, filed Sep. 18, 2013, which claims benefit of New Zealand applications 602506, filed Sep. 18, 2012 and 606618, filed Feb. 4, 2013.

BACKGROUND OF THE INVENTION

Portable and collapsible wheelchairs have been developed in the past and one such wheelchair is described in U.S. Pat. No. 5,857,688. However no rear steer wheelchairs have been described that provide a lightweight and portable wheelchair with an ability to be maneuvered over moderately rough terrain.

It is therefore an object of the invention to provide the public with a useful choice or to at least provide the public with a useful alternative.

SUMMARY OF THE INVENTION

The present invention provides a rear steer portable and collapsible wheelchair having;
  (a) a pair of side frame assemblies each having an upper tube member and a lower tube member and forward and aft sections; and
  (b) a scissor hinge assembly mounted on the side frame assemblies, which hinge extends centrally between the side frame assemblies, which hinge assembly is foldable from between an in-use position to a collapsed position;
  (c) a pair of front wheels with each wheel being attached to the forward section of the side frame assemblies,
  (d) a pair of rear steer wheels with each wheel being attached to the aft section of the side frame assemblies,
  (e) a pair of collapsible pushing arms that are attached to the side frame assemblies,
  (f) a pair of arm rests that are attached to the side frame assemblies,
  (g) a back support means, which is attached to the aft section of at least one of the side frame assemblies; and
  (h) a seat support that extends above the scissor hinge and between the side frame assemblies;
wherein in use the wheelchair is deployed by (i) spreading the side frame assemblies apart to pull the scissor hinge into a locked position and (ii) putting the pair of collapsible pushing arms into a locked in-use position and further wherein in use the wheelchair is collapsed by (i) pulling a handle proximate the central position of the scissor hinge to release the locked position of the scissor hinge to pull the side frames assemblies together, and (ii) collapsing the collapsible arms from their in-use locked position to a folded out of use position into a compact, readily lifted and transportable configuration.

In one embodiment, the scissor hinge includes a pair of geared hinge linkages.

In one embodiment the back support means is secured on a pair of back support arms, each back support arm being attached to the aft section of the proximate side frame assembly.

In another embodiment the rear wheel is biased by way of a biasing member to keep the rear steer wheel aligned in a substantially straight ahead manner.

In another embodiment the pair of collapsible pusher arms include ergonomically angled handles.

In another embodiment the pair of collapsible pusher arms include a brake lever that activates a front wheel brake in at least one of the front wheels.

In another embodiment the wheelchair is collapsible into a size no greater than about 800 mm in length ×about 350 mm in width ×about 700 mm in height.

In one embodiment the wheelchair includes a pair of foot rests that are secured to the forward section of the side frame assembly. Preferably the foot rests can pivot through about 90 degrees relative to the side frame assembly. In another embodiment each foot rest is designed to rotate upwardly against the side frame assembly. More preferably each foot rest is designed to rotate upwardly against the side frame assembly and then to rotate towards the seat support. In an alternative embodiment each foot rest is designed to rotate towards the seat support and then to rotate upwardly against the side frame assembly. In another embodiment the foot rest includes a foot restraint.

In another embodiment the wheelchair further includes a lap safety belt for use by an occupant.

In another embodiment the wheel chair includes at least one hand brake that acts upon at least one of the front wheels.

In another embodiment the handle of the wheelchair that in use is pulled to break the scissor hinge upon collapse of the wheelchair is also adapted in size and shape to provide a carry handle for the wheelchair in its collapsed configuration.

The foregoing brief summary broadly describes the features and technical advantages of certain embodiments of the present invention. Further technical advantages will be described in the detailed description of the invention that follows. Novel features which are believed to be characteristic of the invention will be better understood from the detailed description of the invention when considered in connection with any accompanying figures and examples. However, the figures and examples provided herein are intended to help illustrate the invention or assist with developing an understanding of the invention, and are not intended to be definitions of the invention's scope.

BRIEF DESCRIPTION OF THE DRAWINGS

FIG. 4(*a*) shows a top view of the wheelchair in FIG. 1 in a collapsed state.

FIG. 4(*b*) shows a side view of the wheelchair in FIG. 1 in a collapsed state.

FIG. 4(*c*) shows a bottom view of the wheelchair in FIG. 1 in a collapsed state.

FIG. 4(*d*) shows a front view of the wheelchair in FIG. 1 in a collapsed state.

DETAILED DESCRIPTION OF THE INVENTION

Prior to setting forth the invention in detail, it may be helpful to provide definitions of certain terms to be used herein.

The term "about" as used herein in connection with a referenced numeric indication means the referenced numeric indication plus or minus up to 10% of that referenced numeric indication. For example, the language "about 50" units covers the range of 45 units to 55 units.

Figure 1:
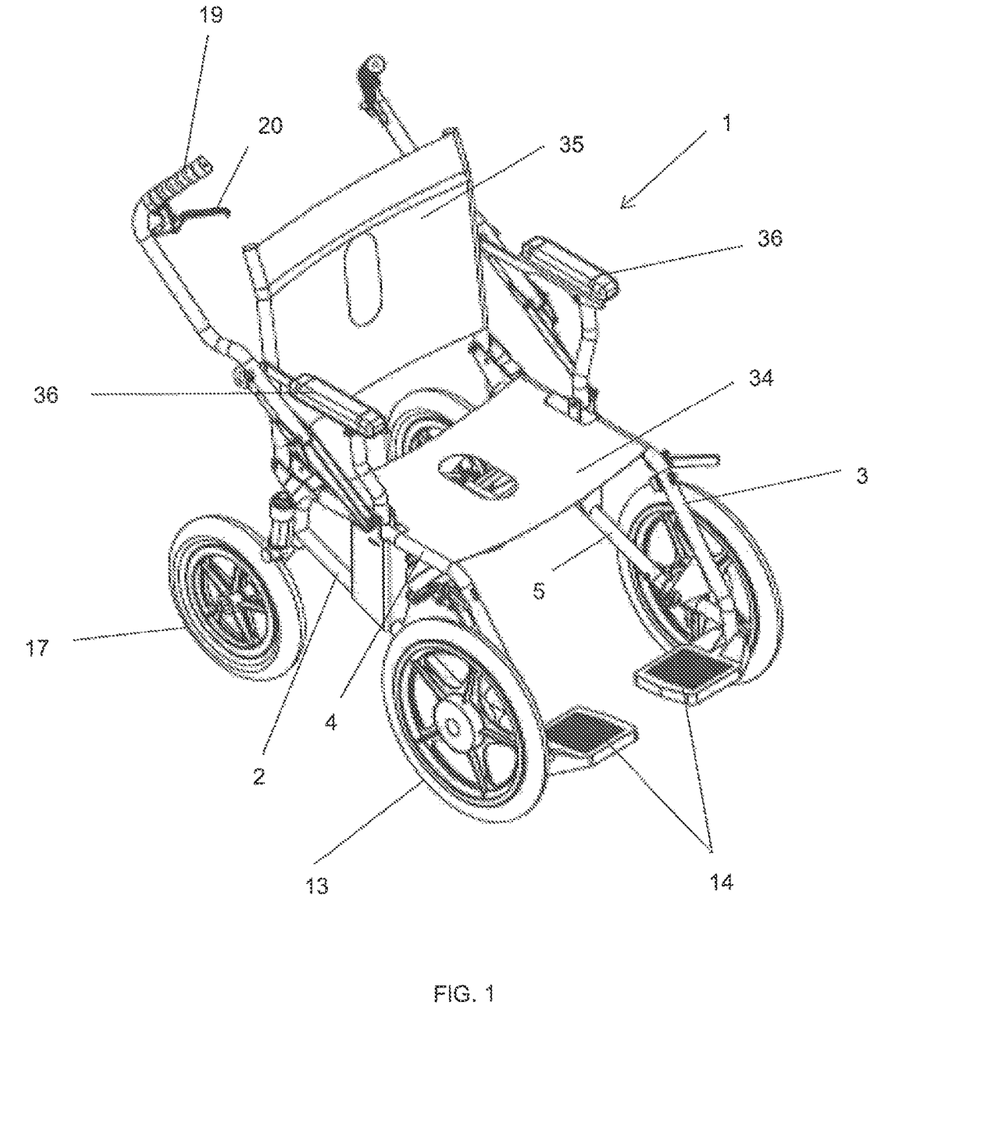
FIG. 1 shows a perspective view of one embodiment of a wheelchair.
Figure 2:
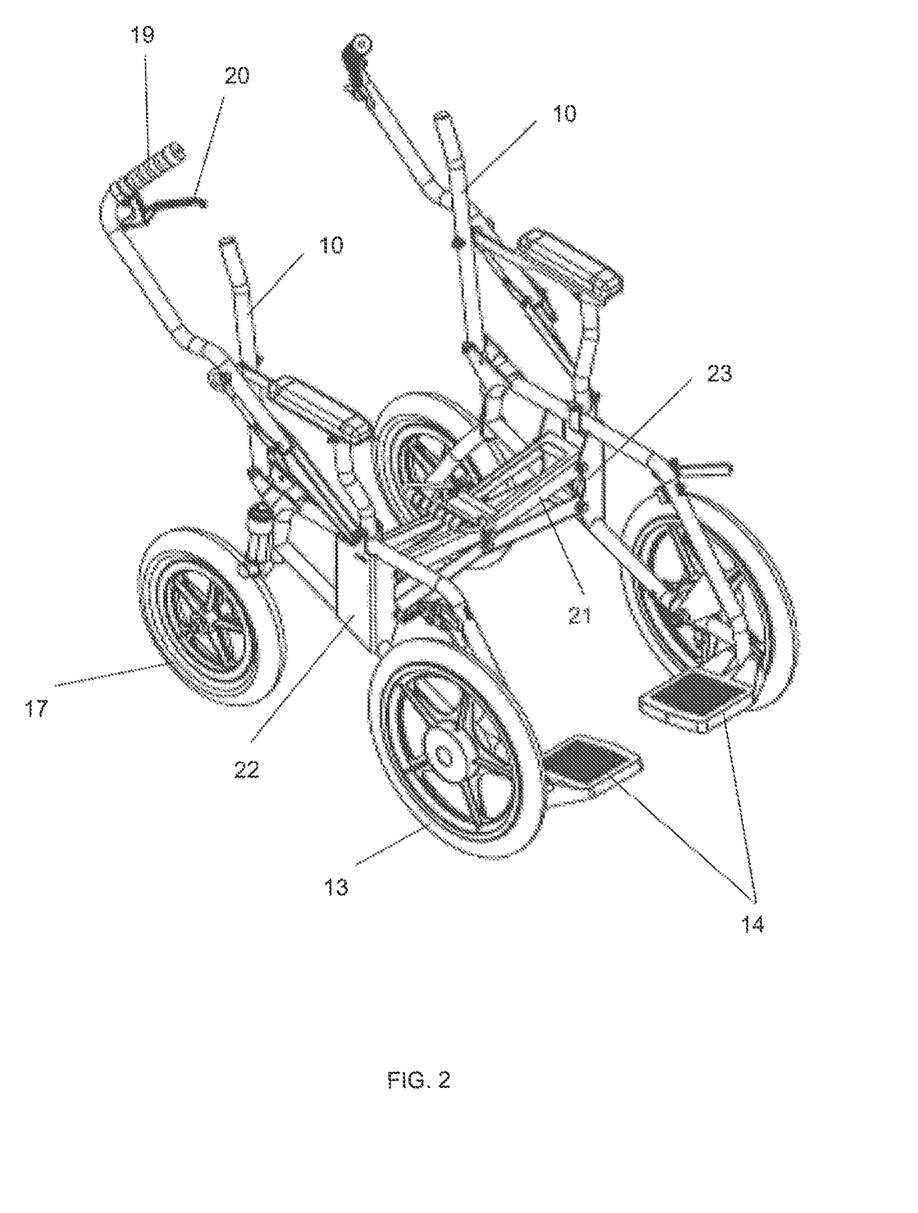
FIG. 2 shows a perspective view of the wheelchair shown in FIG. 1 without the seat and back rest in place.
Figure 3:
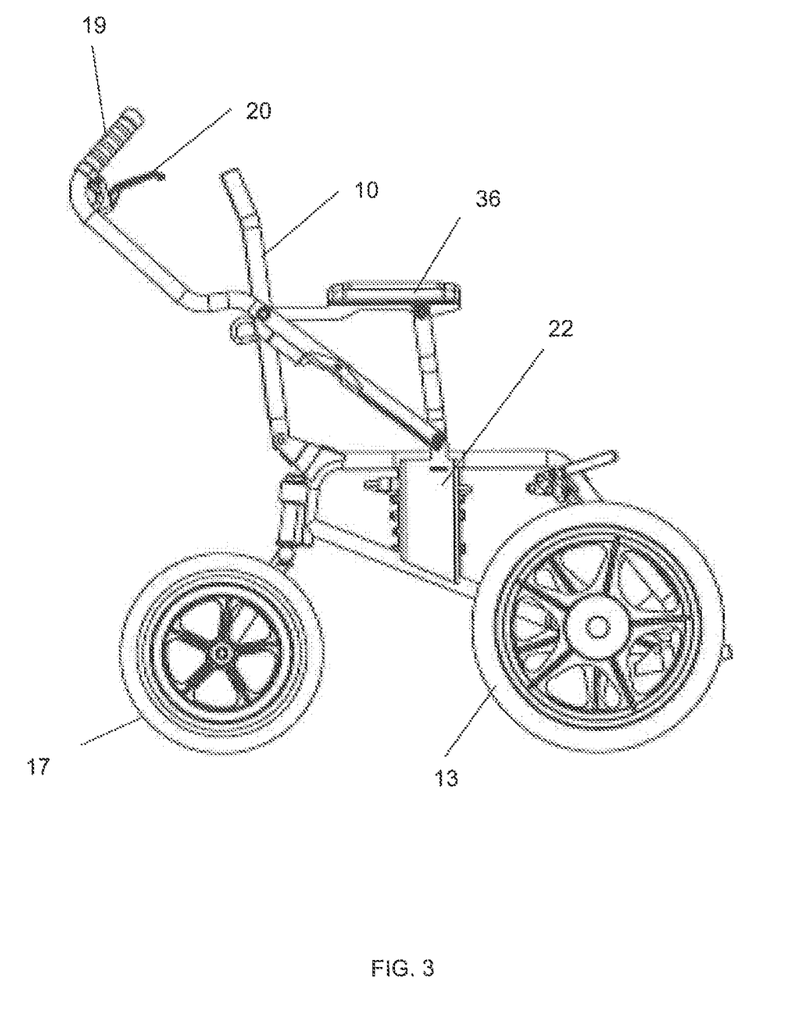
FIG. 3 shows a side view of the wheelchair shown in FIG. 1.
Figure 4A:
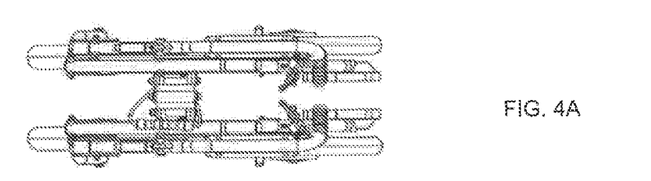
Figure 4B:
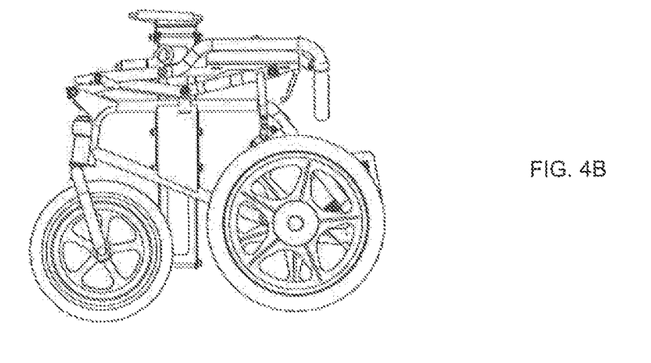
Figure 4C:
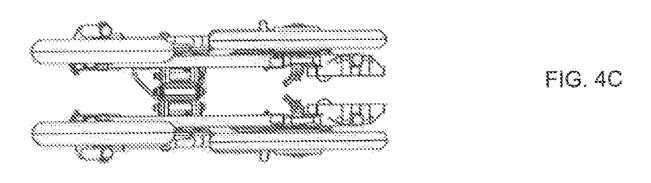
Figure 4D:
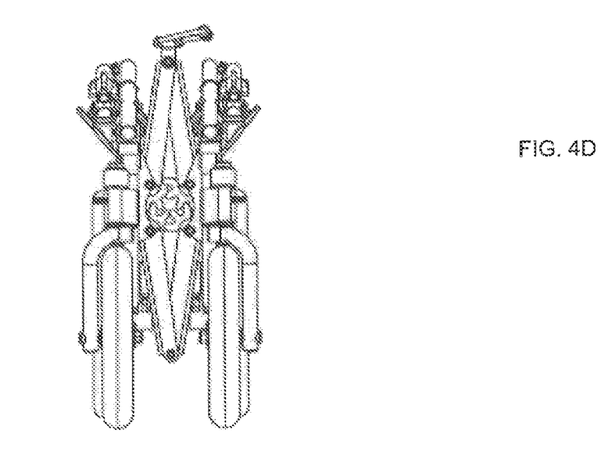
Figure 6A:
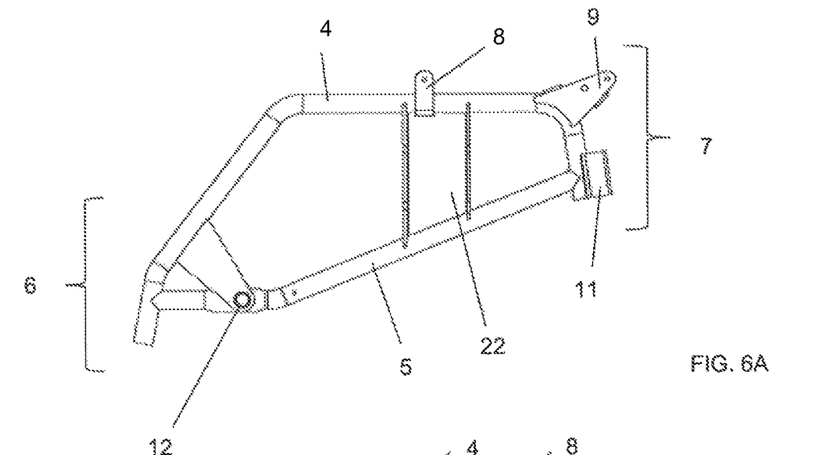
FIG. 6(a) shows a side view of the right side frame assembly of the wheelchair.
Figure 6B:
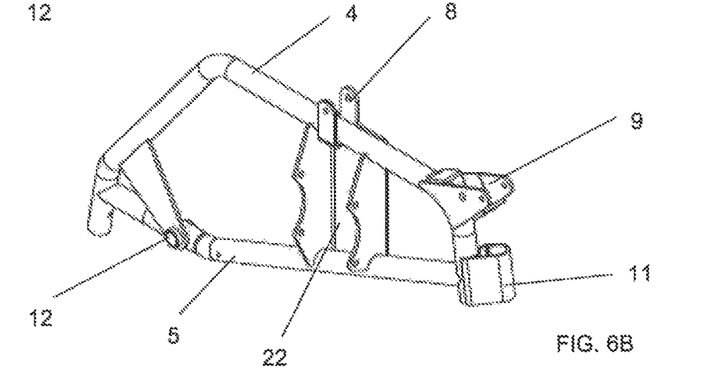
FIG. 6(b) shows a top perspective view of the side frame assembly shown in FIG. 6(a).
Figure 6C:
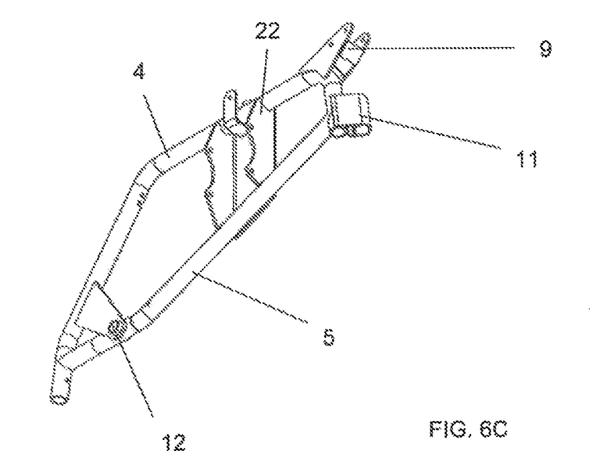
FIG. 6(c) shows a bottom perspective view of the side frame assembly shown in FIG. 1 in a collapsed state.
Figure 8A:
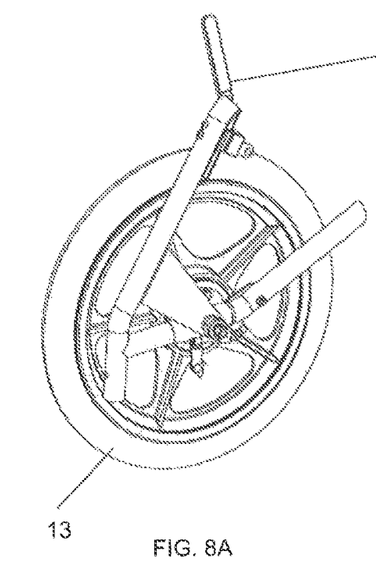
FIG. 8(a) shows the mounting of a front wheel to the forward section of the side frame assembly.
Figure 8B:
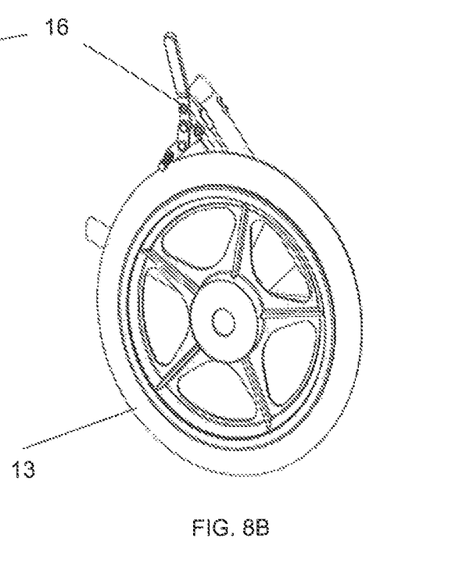
FIG. 8(b) shows the mounting of a front wheel hand brake proximate the forward section of the side frame assembly.
Figure 9A:
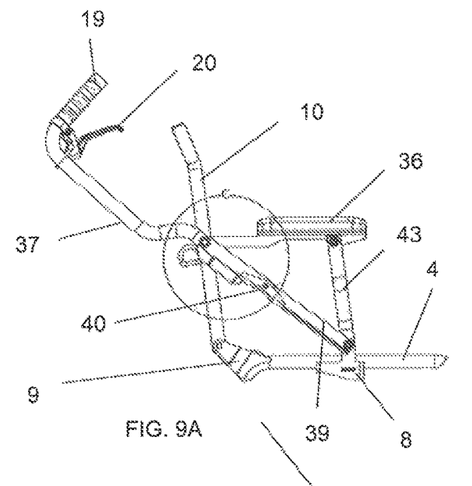
FIG. 9(a) shows a side view of the relationship between the handle, arm rest and the upper tube of the side frame assembly in the position when the wheelchair is in deployment mode.
Figure 12A:
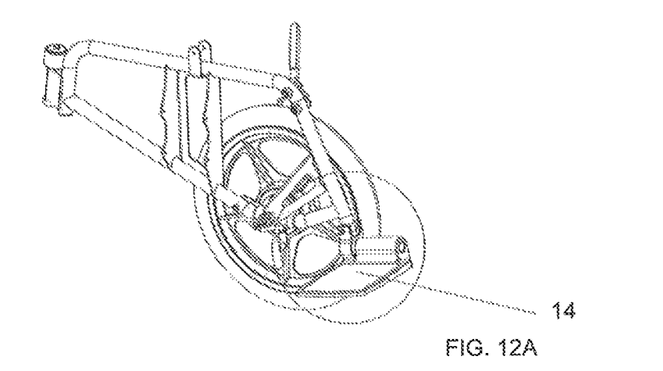
FIGS. 12(a) to 12(c) show the dual rotation feature of a footrest of the invention.
Figure 12B:
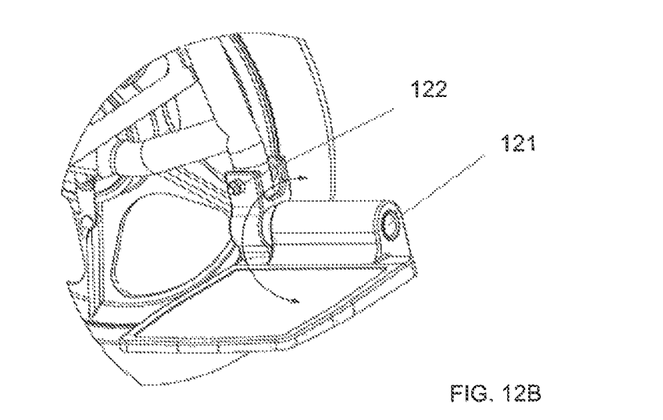
Figure 12C:
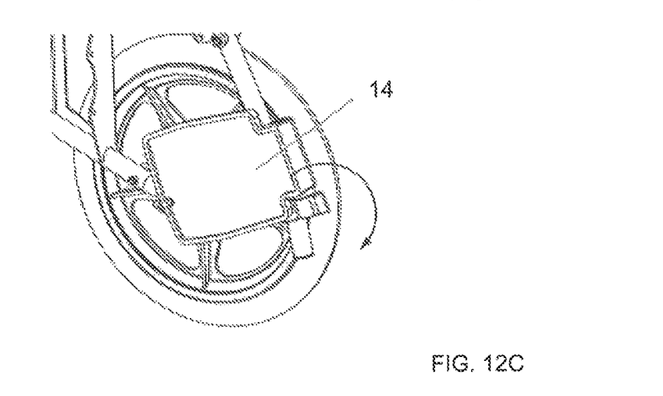

With reference to FIGS. 1 to 3 a wheelchair 1 of one embodiment of the invention is shown. The wheelchair includes a pair of side frame assemblies, 2 and 3 respectively. The side frame assemblies 2 and 3 are equivalent in configuration, shape and dimensions except for the fact that each assembly is a mirror image of the other. The wheelchair 1 has a right side frame assembly 2 and a left side frame assembly 3 when looking at the wheelchair from the back of the chair to the front of the chair. The shape and configuration of the right hand side frame assembly 3 is shown in particular detail in FIGS. 6(a) to 6(c). The side frame assemblies are constructed from metal tubing, having a round, elliptical or square cross section. The tubing is preferably made from aluminum or some other metal preferably light weight metal of about 25 mm-32 mm (1 inch-1¼ inch) in diameter or cross sectional width and depth. The side frame assembly includes an upper tube member 4 and a lower tube member 5. The upper and lower tube members are shaped by bending around formers into the desired shape. The upper tube member 4 is connected to the lower tube section in both the forward section 6 and aft section 7. The lower and upper tube members are joined together at their respective forward and aft sections by welds. The upper tube member 4 of the side frame assembly also provides an arm rest link 8 that is connected by a bolt and bracket system to the upper tube 4. With reference to FIGS. 6(a) to 6(c) the side frame assemblies include an aft upper tube bracket 9 that is used to connect to a back support arm 10 as shown in FIGS. 2 and 9(a). The aft section 7 of the side frame assembly also includes a rear wheel mounting bracket 11. The forward section 6 of the lower tube member 5 provides a mount 12 for a front wheel 13 (as shown in FIG. 8) The forward section of the upper tube member 4 is adapted to provide means to mount a foot rest 14 (as shown in FIG. 1) and also means for mounting a mount 15 for a front wheel hand brake 16. The foot rest 13 in this embodiment is a standard off the shelf hinged foot rest constructed from a light plastics material. Preferably the foot rest is pivotable through about 90 degrees relative to the side frame to ease occupant ingress. The height of the footrests may be positioned at a plurality of heights along the upper side frame 4 to suit the occupant as required. As shown in the foot rest embodiment in FIGS. 12(a) to 12(c) a dual rotation foot rest mechanism is illustrated. The foot rest 14 is first rotatable about 90 degrees towards the side frame as shown in FIG. 12(c) about a first axle or pivot 121. The folded footrest 14 is then further rotatable towards the seat of the wheelchair about a second pivot point 122. The footrest when folded about the second pivot point 122 (as shown in FIG. 12(c) shows the foot rest folded against the side frame and out of the space through which a user must step to get into or out of the seat. In one embodiment the foot rest may include a foot restraint, such as but not limited to a foot strap that would go over the foot of the wheelchair occupant and where the strap can be tightened to secure the occupant's foot to the foot rest.

Figure 8C:
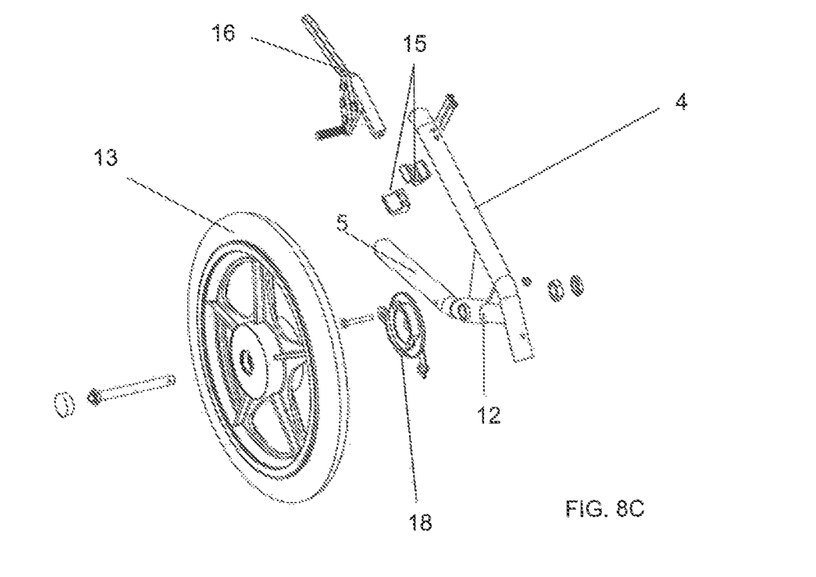
FIG. 8(c) shows the mounting of a front hub disc brake between the front wheel and the side frame assembly and also the components that allow for the mounting of the front wheel hand brake shown in FIG. 8(b).

The front and rear wheels 13 and 17 respectively may optionally include mudguards to protect the chair occupant from splashes or dirt and dust flicking of the wheels. The front wheel 13 is preferably between 8-20 inches in diameter (more preferably around 16 inch) and includes preferably plastic or metal spoked rims, or the front wheel is a composite wheel, which by way of example is, constructed from plastic spokes and an aluminum rim. The front wheel preferably has either an inflatable pneumatic tyre or polyurethane foam filled rubber tyre. The size of the rear wheel is a 12.5 inch wheel but it is envisaged that a range of wheel size from 6 inch to 14 inch would be suitable. The rear wheel preferably includes plastic or metal spoked rims, or the rear wheel is a composite wheel, which by way of example is, constructed from plastic spokes and an aluminum rim. The rear wheel preferably has either an inflatable pneumatic tyre or polyurethane foam filled rubber tyre. It is also preferred that the front and optionally the rear wheels are removable from their axle mounts by a quick release axle, that is a hub push button release system or spring clip. It is also preferred that the front wheel includes an internal expanding shoe drum brake 18 as shown in FIG. 8(c) that is cable operated. With reference to FIG. 1, the cable (not shown) for the brake 18 runs through to the pushing handle 19 proximate which a brake handle 20 is provided to activate the brake. In one embodiment it is also envisaged that it may be desirable to have the two front brakes activated by a single brake lever that may activate both front wheel drum brakes 18 simultaneously.

Figure 5:
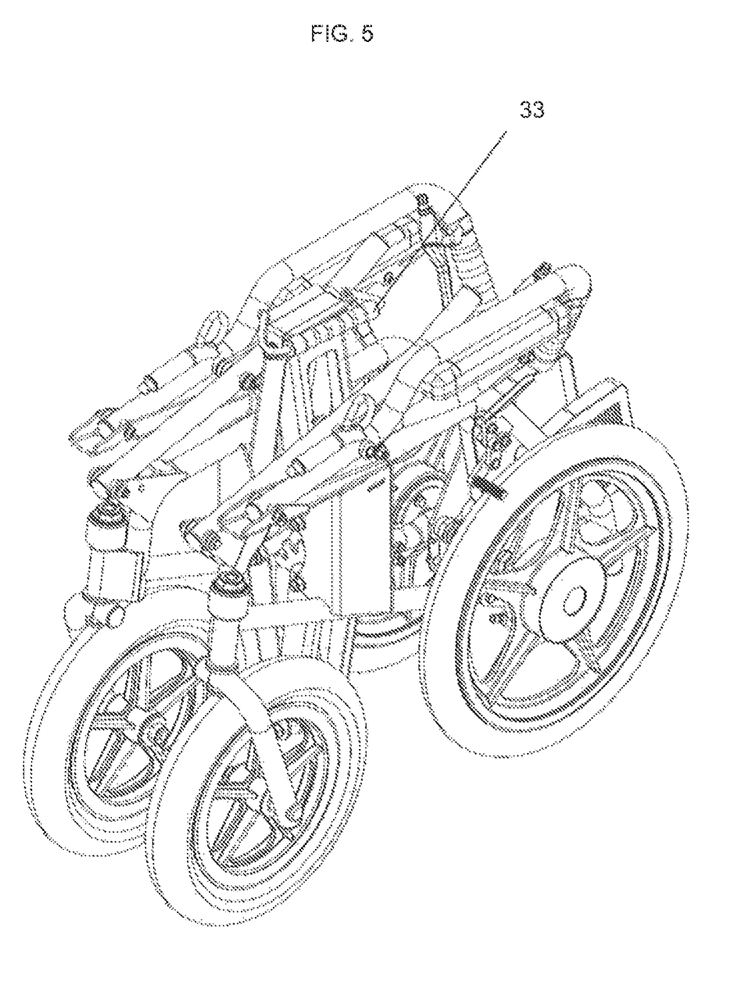
FIG. 5 shows a perspective view of the wheelchair in FIG. 1 in a collapsed state.
Figure 7A:
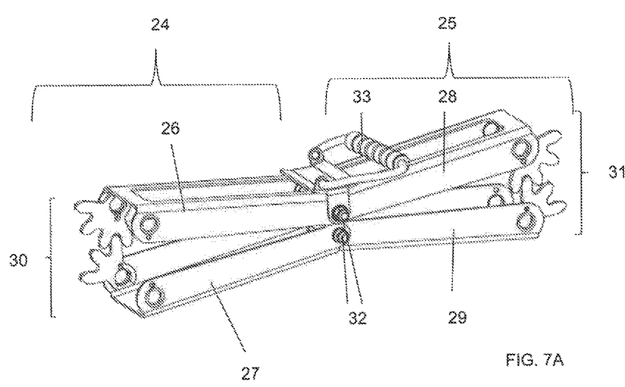
FIG. 7(a) shows a scissor hinge of the present invention as it would appear in a wheelchair ready for use.
Figure 7B:
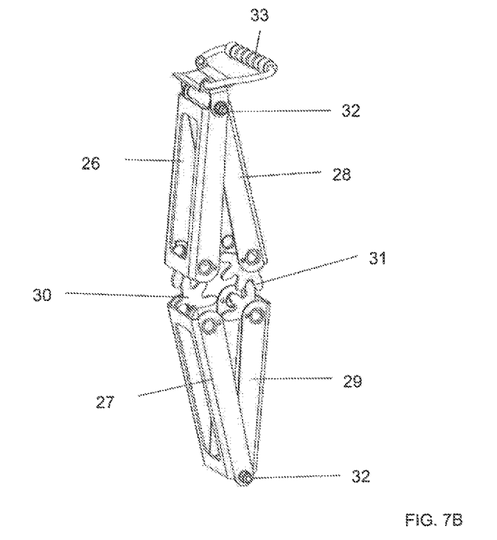
FIG. 7(b) shows a scissor hinge of the present invention as it would appear in a wheelchair that has been collapsed for transport.

The collapsibility of the wheelchair is achieved by a scissor hinge assembly 21 as shown in FIGS. 7(a) and 7(b). The scissor hinge assembly is mounted to the pair of side frames by way of a pair of hinge mounts 22 and 23 respectively that are positioned between the upper and lower tube members of the side frame assemblies 2 and 3. The hinge mounts 22 and 23 are located substantially centrally along the length of the upper and lower tube members of the side frame assemblies as shown in FIGS. 6(a) to 6(c). The hinge mounts span between the upper and lower tube members. With reference to FIG. 7(a) the scissor hinge includes a pair of geared hinge units 24 and 25 respectively. Each geared hinge unit includes an upper hinge linkage (upper hinge linkages (26 and 28) respectively and lower hinge linkages (27 and 29)) respectively. However, it is to be appreciated that these hinge units 24 and 25 could be rotated 90 degrees to provide a front and rear/aft facing linkage. The hinge linkage rotates about a pivot point through a pair of involute sector spur gears 30 and 31 that positively engage with each other and lead to a locked hinge arrangement when the wheel chair is deployed for use. The gears 30 and 31 maintain the correct relative positions of the linkages. In use, the arrangement of the hinge linkages is such that you can achieve a locking action brought about by an over centre arrangement/geometry of the linkages. Preferably the scissor hinge assembly would include a positive stop on the upper and lower linkages that prevents the linkages from clashing around the central pivot section 32. In use, when the wheelchair 1 is being collapsed, the hinge linkages are broken by pulling on a handle 33 attached to the upper pair of linkages 26 and 28 at the central pivot section 32. With reference to FIGS. 1 and 5 the handle 33 is pulled to extend through the seat base 34 and collapsed back rest 35 to bring the side frame assemblies 2 and 3 of the wheelchair 1 together. It is to be appreciated that the hinge linkages may be made out of a lightweight metal (such as aluminum, titanium or pressed steel) or a rigid plastics material or a composite or plastic and metal.

Figure 9B:
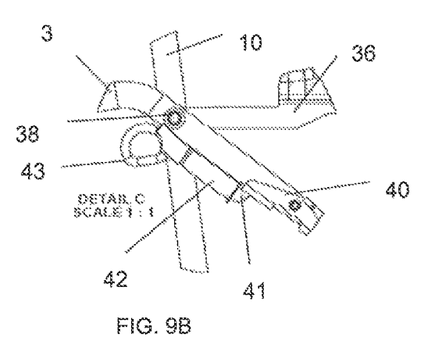
FIG. 9(b) shows a side view of the detail from section c of FIG. 9(a).
Figure 9C:
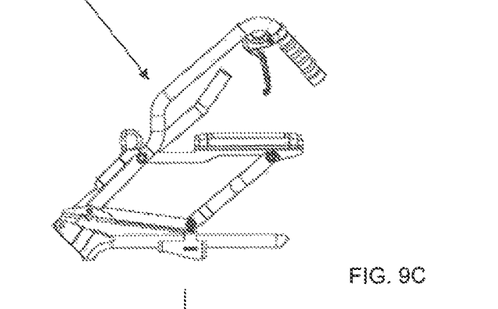
FIG. 9(c) shows a side view of the relationship between the handle, arm rest and the upper tube of the side frame assembly when the wheelchair is in a partially collapsed mode.
Figure 9D:
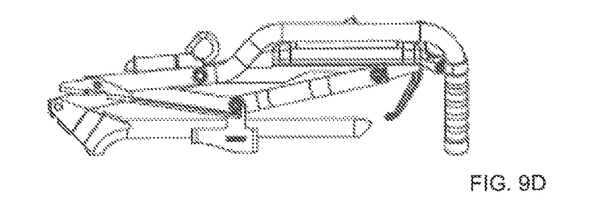
FIG. 9(d) shows a side view of the relationship between the handle, arm rest and the upper tube of the side frame assembly when the wheelchair is in collapsed mode.

With reference to FIGS. 1 and 2, the pair of side frame assemblies 2 and 3 also support a pair of arm rests 36 by way of an arm rest link 8 (see FIG. 6(a)-6(c) by a bolt and bracket system. A pair of conventional arm rests 36 are provided and are shown in the embodiment exemplified. It is to be appreciated that unconventional or modified arm rests may be provided where an occupant's specific needs require a modified arm rest. With reference to FIG. 9 (a) and section c as shown expanded in FIG. 9(b) the rear of the arm rest 36 is mounted partway along the length of the pushing handle and the back rest upright 10. It can be seen from FIG. 9(a) that there is a four bar linkage hinge between the collapsible pushing arms 37 and the arm rest 36. As shown in FIG. 9(b) the bracket for the aft section of the arm rest 36 also mounts the bracket or link 38 for the collapsible pushing arm 37. The pushing arm 37 at its lower end is pivotally attached to the side frame assembly 2 by an arm rest link 8. The arm rest link 8 is a folded plate, die cast or extrusion linkage which also connects to an arm rest linkage 44. The connection between the pushing arm 37 and the pushing arm link 40 is controlled by a releasable or retractable locking pin 41 that is mounted on the lower part of the pushing arm 37. The locking pin 41 prevents the rotation of the pushing handle 37 relative to the pushing arm link 40. The locking pin 41 slides in a sleeve 42 mounted on the pushing arm 37. The locking pin 41 can be retracted clear of the pushing handle link 40 by retracting the pin into the sleeve 41 by an actuating means 43. The pushing arm 37 at its upper end is shaped and dimensioned to provide an ergonomically positioned handle 19. The pushing handle 19 also supports a brake lever 20 that controls in this example front wheel brakes and optionally other controls such as, rear brakes and rear wheel pivot limiters or the like.

The brake levers 20 also preferably include a locking pin (not shown) so that the brakes can be engaged on a permanent basis until selectively disengaged.

Figure 11:
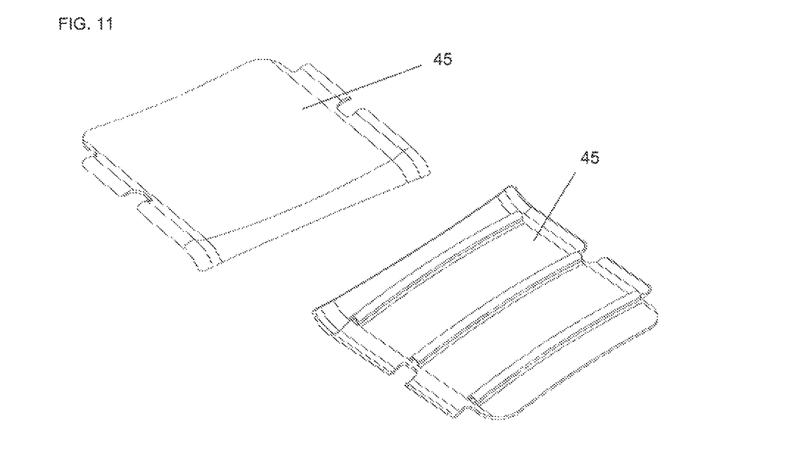
FIG. 11 shows the top and bottom perspective views of a rigid moulded plastics seat for use in the wheelchair of the invention.

With reference to FIG. 1, the back rest uprights 10 may optionally include a support link between the back rest uprights. The back rest 35 and seat support 34 may be made from a wear resistant fabric, such as an acrylic canvas or a nylon canvas. Alternatively the back rest and or seat support may be a solidly contoured detachable insert that is put in place as required. A suitable shaped seat support is shown in FIG. 11. The molded plastic fibreglass or plastics seat base 45 would clip onto the side frame and would optionally include a foam pad on the seat pad to provide cushioning for the occupant. The back rest may also include a molded plastic or fibreglass support that slides over the back rest uprights. The back rest may be adapted to include pockets or fixtures to secure water bottles and/or to provide a head support for the occupant. Similarly the back rest or the seat base may be adapted to provide fixtures to secure or contain a catheter bag or other medical devices required by the wheelchair occupant.

Figure 10A:
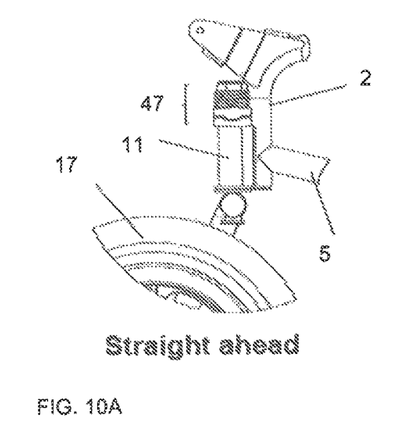
FIG. 10(a) shows a side view of the rear wheel connection to the aft section of the side frame assembly where the rear wheel is being propelled in a straight ahead direction.
Figure 10B:
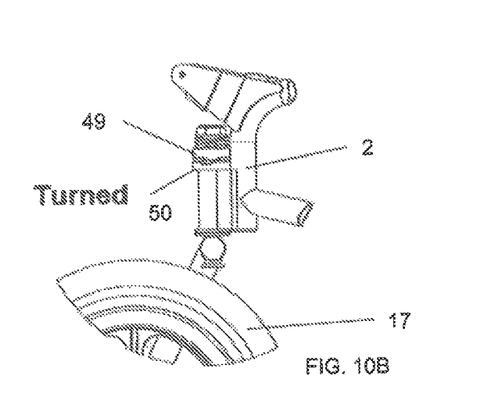
FIG. 10(b) shows a side view of the rear wheel connection to the aft section of the side frame assembly where the wheel is being turned.
Figure 10C:
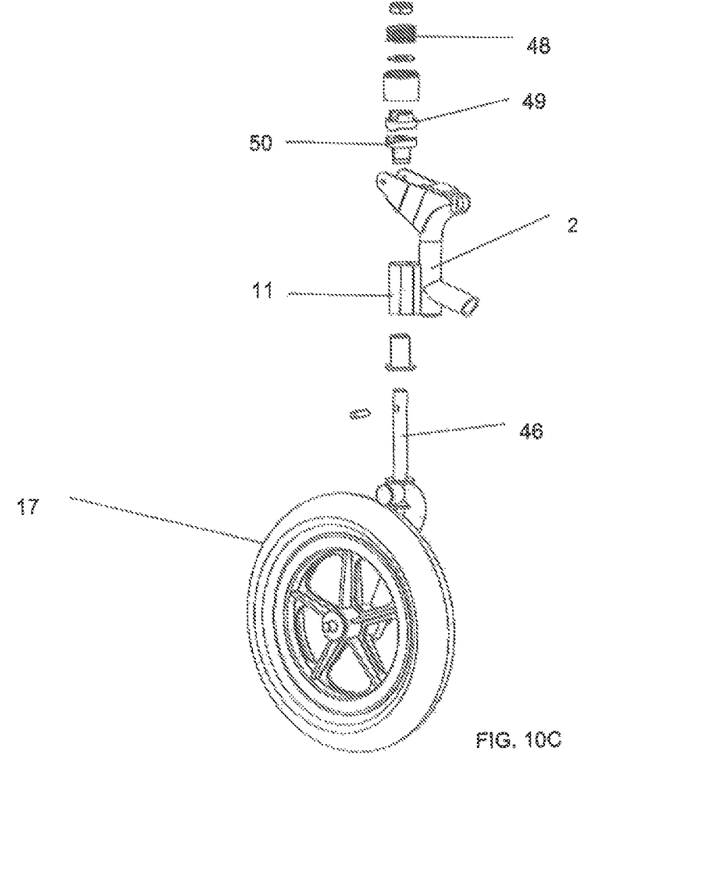
FIG. 10(c) shows a perspective exploded view of the components of the rear wheel mounting connection to the side frame assembly.
Figure 10D:
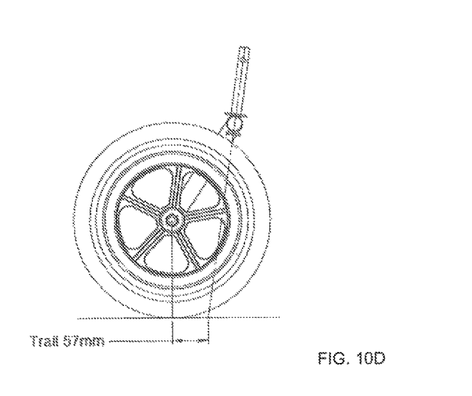
FIG. 10(d) shows a side view of the rear wheel showing the trail of the hub of the wheel relative to the centre of the pivot mount of the wheel to the side frame.

With reference to FIGS. 10(a) to 10(d) each rear wheel 17 is mounted to the side frame assembly by a leg 45 sliding into a rear wheel mounting bracket 11. It is also envisaged that a quick release mechanism provided by a depressible pin that fits into a complimentary hole on the leg 46 would allow for the rear wheel 17 and leg 46 to be quickly removed for compact transport reasons. To enhance the stability of the rear steer wheelchair, the connection of the rear wheel 17 to the side frame assembly 2 has been achieved by using a biasing swivel connection assembly such that when the chair is being propelled forward the wheel trails behind the leg by a trail distance of around 50-60 mm. This is achieved by using a biased swivel connection 47 to (i) keep the wheel in a trailing position and discourage the wheel from turning and becoming unstable and (ii) to hold the wheel in a forward facing position when the wheel chair is collapsed and folded up into a packed position. The biasing may be by spring 48 and face cam 49, 50 as shown in FIGS. 10(a)-10(c), but it is to be appreciated that other biasing means may be employed. One such biasing means would be the use of a detent system or a pin system that biases the wheel into the desirable position.

In the embodiment illustrated the angle of the side frame extending to the leg relative to the normal of the ground is about 4 to 8 degrees. In the embodiment shown in FIG. 10(d) the trail 51 of the wheel is about 57 mm.

It is to be appreciated that the overall centre of gravity of the chair, and therefore stability of the chair, can be modified by moving the side frames forward or back relative to the wheels of the chair. Similarly adjustments in the height of the seat relative to the wheels will also affect the overall centre of gravity of the chair.

Use of the Wheelchair

The wheelchair is expected to be used as any other standard wheelchair would be used. However, with the rear steer aspect and ease of deployment and collapsibility it is anticipated that this wheelchair will appeal to those wheelchair users who like getting out and going places. Furthermore with the use of larger front wheels with wider pneumatic tyres the wheelchair has the ability to go over rougher terrain with ease. Traditional wheelchairs will stop if their small front wheels hit a pebble or some other imperfection in the ground surface. It is hoped that people associated with wheelchair users will be more inclined to take the wheelchair to places that might not have been suitable for more traditional style wheelchairs.

In use, the wheelchair can be easily deployed by pulling the side frames of the wheelchair apart to lock the scissor hinge in a locked position. The pushing arms of the wheelchair can be readily pulled back into a locked position. When the occupant is positioned in the chair and secured by an optional lap belt, the chair is ready for use. Once the chair has been used and needs to be transported say in a vehicle the pushing arms of the wheelchair can be folded down towards the seat of the chair, the handle that brakes the locked scissor hinge configuration is pulled and passed through the seat of the chair to collapse the scissor hinge and thereby bring the side frames of the chair closer together. The scissor hinge handle can then be used as a carry handle to carry the wheelchair in its collapsed configuration. Various views of the collapsed wheelchair are shown in FIGS. 4(a) to 4(c) and FIG. 5.

The present invention and its embodiments have been described in detail. However, the scope of the present invention is not intended to be limited to the particular embodiments of the invention described in the specification. Various modifications, substitutions, and variations can be made to the disclosed material without departing from the spirit and/or essential characteristics of the present invention. Accordingly, one of ordinary skill in the art will readily appreciate from the disclosure that later modifications, substitutions, and/or variations performing substantially the same function or achieving substantially the same result as embodiments described herein may be utilized according to such related embodiments of the present invention. Thus, the following claims are intended to encompass within their scope modifications, substitutions, and variations to the embodiments of the invention disclosed herein.

What is claimed is:

1. A rear steer portable wheelchair having:
   (a) a pair of side frame assemblies each having an upper tube member and a lower tube member and forward and aft sections; and
   (b) a scissor hinge assembly mounted on the side frame assemblies, which scissor hinge assembly extends from a central position between the side frame assemblies, which scissor hinge assembly is foldable from between an in-use position to a collapsed position, which scissor hinge assembly includes a hinge comprising a pair of geared hinge linkages, and which hinge linkages are configured to allow a locked hinge arrangement;
   (c) a pair of front wheels with each wheel being attached to the forward section of the side frame assemblies,
   (d) a pair of rear wheels for steering, with each wheel being attached to the aft section of the side frame assemblies,
   (e) a pair of collapsible pushing arms that are attached to the side frame assemblies,
   (f) a pair of arm rests that are attached to the side frame assemblies,
   (g) a back support means, which is attached to the aft section of at least one of the side frame assemblies; and
   (h) a seat support that extends above the scissor hinge assembly and between the side frame assemblies;
   wherein in use the wheelchair is deployed by (i) spreading the side frame assemblies apart to pull the scissor hinge assembly into a locked position and (ii) putting the pair of collapsible pushing arms into a locked in-use position, and further wherein in use the wheelchair is collapsed by (i) pulling a handle proximate the central position of the scissor hinge assembly to release the locked position of the scissor hinge assembly to pull the side frame assemblies together, and (ii) collapsing the collapsible arms from their locked in-use position to a folded out of use position thereby obtaining a collapsed configuration that is compact, readily lifted, and transportable.

2. The wheelchair as claimed in claim 1 wherein the back support means is secured on a pair of back support arms, each back support arm being attached to the aft section of the side frame assembly.

3. The wheelchair as claimed in claim 1 wherein the rear wheel is biased by way of a biasing member to keep the rear steer wheel aligned in a substantially straight ahead manner.

4. The wheelchair as claimed in claim 1 wherein the pair of collapsible pushing arms include ergonomically angled handles.

5. The wheelchair as claimed in claim 1 wherein the pair of collapsible pushing arms include a lever brake that activates a front wheel brake in at least one of the front wheels.

6. The wheelchair as claimed in claim 1 wherein the wheelchair is collapsible into a size no greater than about 800 mm in length by about 350 mm in width by about 700 mm in height.

7. The wheelchair as claimed in claim 1 wherein the wheelchair includes a pair of foot rests that are secured to the forward section of the side frame assembly.

8. The wheelchair as claimed in claim 1 wherein the wheelchair further includes a lap safety belt for use by an occupant.

9. The wheelchair as claimed in claim 1 wherein the wheel chair includes at least one hand brake that acts upon at least one of the front wheels.

10. The wheelchair as claimed in claim 1 wherein the handle of the wheelchair that in use is pulled to break the scissor hinge assembly upon collapse of the wheelchair is also shaped as a carry handle for the wheelchair in the collapsed configuration.

* * * * *